(12) United States Patent
Fujitomi

(10) Patent No.: US 9,864,096 B2
(45) Date of Patent: Jan. 9, 2018

(54) BAG ABNORMALITY DETECTION DEVICE AND BAG ABNORMALITY DETECTION METHOD

(71) Applicant: TOYO JIDOKI CO., LTD., Tokyo (JP)

(72) Inventor: Takehiro Fujitomi, Iwakuni (JP)

(73) Assignee: TOYO JIDOKI CO., LTD., Tokyo (JP)

( * ) Notice: Subject to any disclaimer, the term of this patent is extended or adjusted under 35 U.S.C. 154(b) by 0 days.

(21) Appl. No.: 15/403,557

(22) Filed: Jan. 11, 2017

(65) Prior Publication Data

US 2017/0205530 A1    Jul. 20, 2017

(30) Foreign Application Priority Data

Jan. 15, 2016 (JP) ................................ 2016-006134

(51) Int. Cl.
| | |
|---|---|
| *G01N 21/00* | (2006.01) |
| *G01V 8/20* | (2006.01) |
| *G01B 11/24* | (2006.01) |
| *B65B 57/04* | (2006.01) |

(52) U.S. Cl.
CPC ............... *G01V 8/20* (2013.01); *B65B 57/04* (2013.01); *G01B 11/24* (2013.01)

(58) Field of Classification Search
CPC .......... G01B 11/24; G01V 8/20; B65B 43/46; B65B 57/02; B65B 57/04; B65G 2201/0238; B65G 2203/0208; B65G 2203/042; B65G 43/08
USPC ....... 356/240.1, 239.6, 239.4, 601, 614, 625
See application file for complete search history.

(56) References Cited

FOREIGN PATENT DOCUMENTS

| | | |
|---|---|---|
| JP | 2578608 Y | 5/1998 |
| JP | 2001-072004 A | 3/2001 |
| JP | 2002-302227 A1 | 10/2002 |
| JP | 2002-308223 A | 10/2002 |
| JP | 2006-036325 A | 2/2006 |
| JP | 2009-161230 A | 7/2009 |

*Primary Examiner* — Tri T Ton
(74) *Attorney, Agent, or Firm* — Pillsbury Winthrop Shaw Pittman LLP

(57) ABSTRACT

A bag abnormality detection device includes a synchronous sensor, a first bag detection sensor, a second bag detection sensor and a controller. When the synchronous sensor detects a change, at a first detection point, from a state in which the bag is absent to a state in which the bag is present and the detection result of the first bag detection sensor indicates that the bag does not exist at a second detection point, the controller recognizes that the bag has an abnormality. When the synchronous sensor detects a change, at the first detection point, from a state in which the bag is present to a state in which the bag is absent and the detection result of the second bag detection sensor indicates that the bag does not exist at a third detection point, the controller recognizes that the bag has an abnormality.

8 Claims, 10 Drawing Sheets

BAG ABNORMALITY DETECTION DEVICE AND BAG ABNORMALITY DETECTION METHOD

CROSS-REFERENCE TO RELATED APPLICATIONS

This application is based upon and claims the benefit of priority from Japanese Patent Application No. 2016-6134, filed on Jan. 15, 2016; the entire contents of which are incorporated herein by reference.

TECHNICAL FIELD

The present invention relates to a bag abnormality detection device and a bag abnormality detection method with which a bend/fold and displacement of a bag being transferred can be detected.

BACKGROUND ART

In a case of commonly-used bagging packaging machines, empty bags stored in a magazine serving as an empty bag storage unit are positioned properly by keeping the empty bags' mouth edges in contact with a stopper, for example, and the positioned empty bags are extracted from the magazine one by one and supplied to grippers. The supply of the empty bags to the grippers is performed by having the grippers directly pinch each empty bag in the magazine or by transferring each empty bag in the magazine to the grippers while suction holding it so as to hand over it to the grippers, for example. Each empty bag supplied to the grippers is transferred in the state of being gripped by the grippers. During the transfer, various types of prescribed packaging processes are performed successively, such as the printing of information like the best-before date, the opening of the bag mouth, the loading of the bag with the contents to be packaged, and the sealing of the bag mouth.

However, when the empty bags are relatively thin and soft and lack stiffness, there are cases where the bag mouths placed in contact with the stopper bend or fold during the positioning of the empty bags and the bend/fold causes a positioning failure (see FIG. 6 of Japanese patent application publication No. 2006-036325, for example).

Further, when the surface of the bag is made of a relatively slippery material, there are cases where the bag is displaced in its lengthwise direction when the empty bag is supplied to the grippers or when the empty bag gripped by the grippers is loaded with the contents to be packaged. Furthermore, similar problems may arise in cases where the contents to be packaged contain oil or the like and the contents adhere to empty bag holding surfaces of an empty bag supply device or gripping surfaces of the grippers.

As explained above, when the positioning or the supply of the bag is not performed appropriately or when the gripping of the bag by the grippers is not performed appropriately, the empty bag is gripped by the grippers in a condition deviated from the original arrangement. If the sealing process is performed on the mouth of the bag in such a condition, the position of the seal formed at the bag mouth deviates from the original position. Such a packaging bag with a deviated seal position is not only inferior in appearance but can also be handled as a defective packaging bag (see FIG. 4 of Japanese Utility Model Registration No. 2578608, for example).

In consideration of such a situation, Japanese Utility Model Registration No. 2578608 discloses a bag gripping position detection device that detects the position of the bag relative to the grippers by using a sensor. If the bag is gripped by the grippers in a condition deviated from a prescribed position, the bag gripping position detection device skips the subsequent packaging processes (e.g., the contents loading process, the bag mouth sealing process, etc.) and ejects the bag in the empty state to the outside of the machine. With the bag gripping position detection device, the occurrence of defective packaging bags can be reduced, and further, the empty bag ejected to the outside of the machine can be reused by setting the empty bag in the packaging machine again.

SUMMARY OF INVENTION

Technical Problem

While the aforementioned detection device disclosed in Japanese Utility Model Registration No. 2578608 is capable of detecting whether the bag is being transferred in an appropriate condition, it is necessary to adjust the position of the sensor in accordance with the size and the shape of each bag. Specifically, while the judgment on whether the bag is being transferred in an appropriate condition is made in the detection device of Japanese Utility Model Registration No. 2578608 in accordance with detection results of a first sensor and a second sensor arranged at positions for detecting an upper limit position and a lower limit position of a top part of the bag, specific detection positions of the first and second sensors have to be determined in accordance with the size of the bag.

Thus, the detection positions of the first and second sensors have to be adjusted precisely in accordance with the size of the bag which is a transfer object. Accordingly, in a transfer machine for transferring bags of various sizes, fine adjustment becomes necessary each time the size of the bag as the transfer object is changed, which is not only extremely troublesome but also needs high precision of the adjustment.

Further, in conventional detection devices like the one described above, a problem can arise also when the transfer speed of the bag is changed significantly. In the detection device disclosed in Japanese Utility Model Registration No. 2578608, the bag detection timing of each sensor is set previously. In cases where the bag is moved intermittently by grippers attached to an intermittent rotation table, whether the attitude of the bag is appropriate is detected by acquiring the result of detection from each sensor at the time of stoppage of the bag. However, there are cases where the detection position of each sensor is set close to a corner of the bag in order to detect the condition of the corner of the bag, and thus the detection result of each sensor can vary due to slight displacement of the bag. On the other hand, there are cases where the gripping position of the bag shifts slightly in the width direction when the bag is handed over to the grippers even though there is no problem in the attitude of the bag gripped by the grippers. In such cases, a proper judgment cannot be made, because the detection result of each sensor indicates that the attitude of the bag is inappropriate even when the attitude of the bag is actually appropriate. Furthermore, although it may be possible, in cases where the bag stops as in the case of intermittent bag transfer, to capture an image of the bag in the stopped state and detect whether the condition of the bag is appropriate on the basis of the captured image, such detection based on a captured image is difficult in cases where the bag is transferred continuously.

The present invention has been contrived in light of the above-mentioned circumstances, and an object thereof is to provide a technology with which the presence/absence of an abnormality in the condition of bags of various sizes can be detected with high accuracy without necessarily needing precise adjustment of the arrangement.

Solution to Problem

One aspect of the present invention is directed to a bag abnormality detection device for detecting an abnormality of a bag that is transferred, the bag abnormality detection device comprising: a synchronous sensor that detects presence or absence of the bag at a first detection point in a transfer path of the bag; a first bag detection sensor that detects presence or absence of the bag at a second detection point in the transfer path, the second detection point being at a same position as the first detection point or on an upstream side of the first detection point in regard to a transfer direction of the bag; a second bag detection sensor that detects presence or absence of the bag at a third detection point in the transfer path, the third detection point being at a same position as the first detection point or on a downstream side of the first detection point in regard to the transfer direction of the bag; and a controller that controls the synchronous sensor, the first bag detection sensor and the second bag detection sensor, wherein when the synchronous sensor detects a change from a state in which the bag is absent at the first detection point to a state in which the bag is present at the first detection point, the controller acquires a detection result of the first bag detection sensor regarding the presence or absence of the bag at the second detection point, and when the detection result of the first bag detection sensor indicates that the bag does not exist at the second detection point, the controller recognizes that the bag has an abnormality, and when the synchronous sensor detects a change from a state in which the bag is present at the first detection point to a state in which the bag is absent at the first detection point, the controller acquires a detection result of the second bag detection sensor regarding the presence or absence of the bag at the third detection point, and when the detection result of the second bag detection sensor indicates that the bag does not exist at the third detection point, the controller recognizes that the bag has an abnormality.

According to this bag abnormality detection device, the presence/absence of an abnormality in the transfer condition of bags of various sizes can be detected with high accuracy without necessarily needing precise adjustment of the arrangement of the synchronous sensor, the first bag detection sensor and the second bag detection sensor.

Desirably, the second detection point and the third detection point are arranged at positions different from the first detection point in regard to a direction which is perpendicular to the transfer direction of the bag and in which the bag extends.

According to this bag abnormality detection device, the presence/absence of an abnormality can be detected for parts of the bag corresponding to the positions different from the first detection point in regard to the extending direction of the bag orthogonal to the transfer direction of the bag.

Desirably, the bag is transferred in a state where the bag extends in a vertical direction, and the second detection point and the third detection point are arranged above the first detection point in regard to the vertical direction.

According to this bag abnormality detection device, the presence/absence of an abnormality regarding an upper part of the bag in the vertical direction can be detected.

Desirably, the bag is transferred in a state where the bag extends in a vertical direction, and the second detection point and the third detection point are arranged below the first detection point in regard to the vertical direction.

According to this bag abnormality detection device, the presence/absence of an abnormality regarding a lower part of the bag in the vertical direction can be detected.

Desirably, the synchronous sensor includes a first synchronous sub-sensor and a second synchronous sub-sensor, the first detection point includes a first sub-detection point and a second sub-detection point in the transfer path of the bag, the first synchronous sub-sensor detects presence or absence of the bag at the first sub-detection point, the second synchronous sub-sensor detects presence or absence of the bag at the second sub-detection point, and the second detection point is situated at a same position as the first sub-detection point or on an upstream side of the first sub-detection point in regard to the transfer direction of the bag, the third detection point is situated at a same position as the second sub-detection point or on a downstream side of the second sub-detection point in regard to the transfer direction of the bag, when the first synchronous sub-sensor detects a change from a state in which the bag is absent at the first sub-detection point to a state in which the bag is present at the first sub-detection point, the controller acquires the detection result of the first bag detection sensor regarding the presence or absence of the bag at the second detection point, and when the detection result of the first bag detection sensor indicates that the bag does not exist at the second detection point, the controller recognizes that the bag has an abnormality, and when the second synchronous sub-sensor detects a change from a state in which the bag is present at the second sub-detection point to a state in which the bag is absent at the second sub-detection point, the controller acquires the detection result of the second bag detection sensor regarding the presence or absence of the bag at the third detection point, and when the detection result of the second bag detection sensor indicates that the bag does not exist at the third detection point, the controller recognizes that the bag has an abnormality.

According to this bag abnormality detection device, the presence/absence of an abnormality in the transfer condition of bags of various sizes can be detected with high accuracy without necessarily needing precise adjustment of the arrangement of the first synchronous sub-sensor, the second synchronous sub-sensor, the first bag detection sensor and the second bag detection sensor.

Desirably, the third detection point is situated in a range within 3 mm from the first detection point.

According to this bag abnormality detection device, the presence/absence of an abnormality can be detected for bags having various sizes in regard to the bag transfer direction.

Desirably, the bag is transferred in a state where the bag is gripped by a gripper, the first detection point is situated below, in a vertical direction, the gripper that grips the bag transferred in the transfer path, and the second detection point and the third detection point are situated above, in the vertical direction, the gripper that grips the bag transferred in the transfer path.

According to this bag abnormality detection device, the presence/absence of an abnormality in a part of the transferred bag above the gripper in the vertical direction can be detected with appropriate timing and with high accuracy.

Another aspect of the present invention is directed to a bag abnormality detection method of detecting an abnormality of a bag that is transferred, the bag abnormality detection method comprising the steps of: causing a synchronous sensor to detect presence or absence of the bag at a first detection point in a transfer path of the bag; causing a first bag detection sensor to detect presence or absence of the bag at a second detection point in the transfer path, the second detection point being at a same position as the first detection point or on an upstream side of the first detection point in regard to a transfer direction of the bag; and causing a second bag detection sensor to detect presence or absence of the bag at a third detection point in the transfer path, the third detection point being at a same position as the first detection point or on a downstream side of the first detection point in regard to the transfer direction of the bag, wherein when the synchronous sensor detects a change from a state in which the bag is absent at the first detection point to a state in which the bag is present at the first detection point, a detection result of the first bag detection sensor regarding the presence or absence of the bag at the second detection point is acquired, and when the detection result of the first bag detection sensor indicates that the bag does not exist at the second detection point, the bag is recognized to have an abnormality, and when the synchronous sensor detects a change from a state in which the bag is present at the first detection point to a state in which the bag is absent at the first detection point, a detection result of the second bag detection sensor regarding the presence or absence of the bag at the third detection point is acquired, and when the detection result of the second bag detection sensor indicates that the bag does not exist at the third detection point, the bag is recognized to have an abnormality.

According to the present invention, the presence/absence of an abnormality in the transfer condition of bags of various sizes can be detected with high accuracy without necessarily needing precise adjustment of the arrangement of the synchronous sensor, the first bag detection sensor and the second bag detection sensor.

DESCRIPTION OF EMBODIMENTS

Typical embodiments of the present invention will be described below with reference to drawings. Bag abnormality detection devices according to the following embodiments are devices for detecting an abnormality of a bag being transferred in a vertically suspended state with both side edge parts gripped by grippers in a bagging packaging machine. The bag abnormality detection devices are capable of detecting a bend/fold and displacement of each bag, for example. Incidentally, the bag abnormality detection device (bag abnormality detection method) according to each embodiment described below is just an example. The present invention is effectively applicable also to bag abnormality detection devices (bag abnormality detection methods) for detecting an abnormality of a bag being transferred in a state (e.g., level state) other than the "vertically suspended state," for example. The bag abnormality detection devices according to the present invention are widely applicable to various types of machines (systems) related to the transfer of a bag. For example, the present invention is effectively applicable also to machines that do not perform the "bagging process of loading contents into a bag" (i.e., machines other than bagging packaging machines).

First Embodiment

Figure 1:
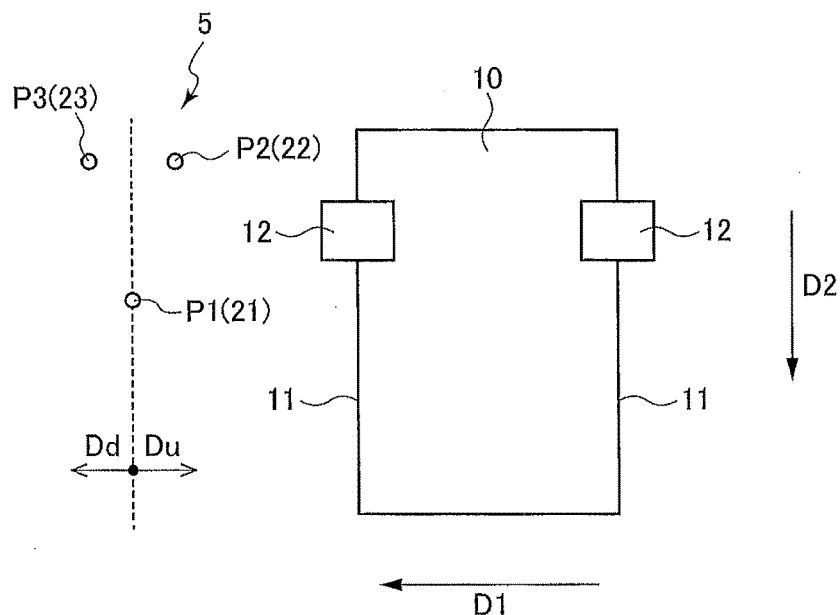
FIG. 1 is a diagram showing the general outline of a bag abnormality detection device according to a first embodiment of the present invention.

FIG. 1 is a diagram showing the general outline of a bag abnormality detection device 5 according to a first embodiment of the present invention.

The bag abnormality detection device 5 according to this embodiment includes a synchronous sensor 21 for detecting the presence/absence of a bag 10 at a first detection point P1 in a transfer path of the bag 10, a first bag detection sensor 22 for detecting the presence/absence of the bag 10 at a second detection point P2 in the transfer path, and a second bag detection sensor 23 for detecting the presence/absence of the bag 10 at a third detection point P3 in the transfer path.

In FIG. 1, detectable regions of the synchronous sensor 21, the first bag detection sensor 22 and the second bag detection sensor 23 are regions extending in the direction orthogonal to the sheet of FIG. 1 and respectively passing through the first detection point P1, the second detection point P2 and the third detection point P3. The types of the synchronous sensor 21, the first bag detection sensor 22 and the second bag detection sensor 23 are not particularly limited. For example, an optical detector formed by a combination of a light-emitting device and a photoreceptor device can be used effectively as each of the synchronous sensor 21, the first bag detection sensor 22 and the second bag detection sensor 23.

The synchronous sensor 21 is a sensor for detecting side edge parts 11 of the transferred bag 10. The first detection point P1 where the presence/absence of the bag 10 is detected by the synchronous sensor 21 is set at a position through which the side edge parts 11 of the transferred bag 10 pass. In this embodiment, the side edge parts on both sides of the bag 10 are gripped by a pair of grippers 12 and the bag 10 is transferred in a vertically extending and suspended state. The first detection point P1 is situated below (below in the vertical direction) the grippers 12 gripping the bag 10 transferred in the transfer path, in regard to the vertical direction D2. From the viewpoint of securely detecting the side edge parts 11 of the bag 10 with the synchronous sensor 21, the first detection point P1 is preferably set at a position through which "parts having high probability of having no abnormality regarding the condition" in the side edge parts 11 of the transferred bag 10 pass. Thus, in this embodiment, the first detection point P1 is set at a position to be immediately under the grippers 12 (e.g., in a range within 20 mm (preferably, within 10 mm) downward from the grippers 12 in the vertical direction).

The first bag detection sensor 22 is a sensor for detecting the presence/absence of a part of the bag 10 at the front end in the transfer direction (hereinafter referred to also as a "front end part (head part)"). In other words, the first bag detection sensor 22 is a sensor for detecting whether the condition of the bag 10 on its front end side in the transfer direction is appropriate. The second detection point P2 where the presence/absence of the bag 10 is detected by the first bag detection sensor 22 is set at a position, in the transfer path, on the upstream side of the first detection point P1 (see the arrow "Du" in FIG. 1) or at the same position as the first detection point P1 in regard to the bag transfer direction D1. In particular, the second detection point P2 of this embodiment is set at a position through which an upper end part (i.e., part at the top in the vertical direction) of the front end part of the transferred bag 10 passes, situated above the grippers 12 gripping the bag 10 in terms of the vertical direction D2, and arranged above the first detection point P1 in regard to the vertical direction D2.

The second bag detection sensor 23 is a sensor for detecting the presence/absence of a part of the bag 10 at the rear end in the transfer direction (hereinafter referred to also as a "rear end part (tail part)"). In other words, the second bag detection sensor 23 is a sensor for detecting whether the condition of the bag 10 on its rear end side in the transfer direction is appropriate. The third detection point P3 where the presence/absence of the bag 10 is detected by the second bag detection sensor 23 is set at a position, in the transfer path, on the downstream side of the first detection point P1 (see the arrow "Dd" in FIG. 1) or at the same position as the first detection point P1 in regard to the transfer direction D1 of the bag 10. In particular, the third detection point P3 of this embodiment is set at a position through which an upper end part (i.e., part at the top in the vertical direction) of the rear end part of the transferred bag 10 passes, situated above the grippers 12 gripping the bag 10 in terms of the vertical direction D2, and arranged above the first detection point P1 in regard to the vertical direction D2.

Incidentally, the influence of the bend/fold and displacement of the bag 10 generally tends to appear remarkably at end parts of the bag 10. Therefore, the detection points of the first bag detection sensor 22 and the second bag detection sensor 23 (i.e., the second detection point P2 and the third detection point P3) are preferably set at the end parts of the bag 10. As the second detection point P2 and the third detection point P3 get close to a position corresponding to an outermost part of the bag 10, the detection regarding the presence/absence of an abnormality of the bag 10 becomes rigorous and detection of slighter bend/fold and displacement becomes possible. However, since the second detection point P2 and the third detection point P3 have to be set at positions through which a normal bag 10 passes during the transfer, the sizes of detectable bags 10 are limited as the second detection point P2 and the third detection point P3 are set at positions apart (especially, apart upward or downward in the vertical direction) from the grippers 12. Therefore, it is desirable to determine the positions of the second detection point P2 and the third detection point P3 (especially, the positions in regard to the vertical direction) in consideration of the sizes of the bags 10 as the objects of detection (especially, the sizes in regard to the vertical direction) and required detection accuracy.

Figure 2:
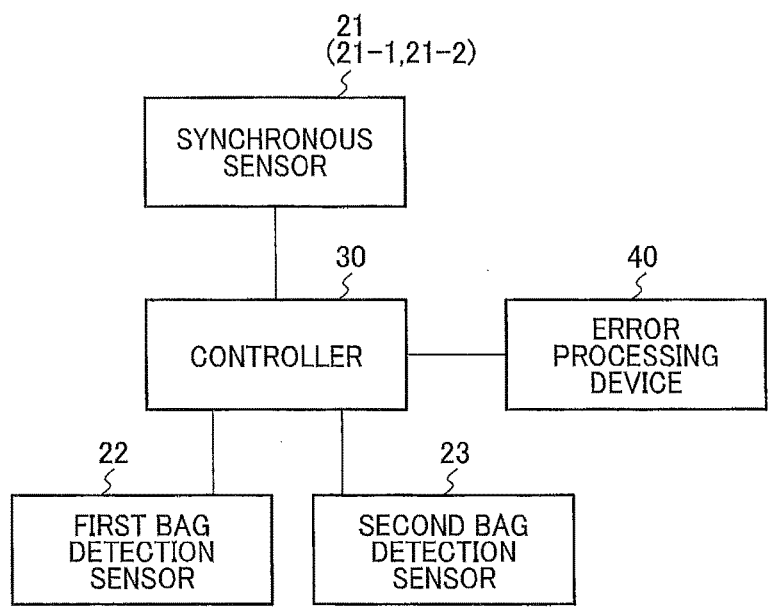
FIG. 2 is a block diagram showing the connective relationship among a synchronous sensor, a first bag detection sensor and a second bag detection sensor connected to a controller.

FIG. 2 is a block diagram showing the connective relationship among the synchronous sensor 21, the first bag detection sensor 22 and the second bag detection sensor 23 connected to a controller 30. The synchronous sensor 21, the first bag detection sensor 22 and the second bag detection sensor 23 are controlled by the controller 30 and transmit detection results (detection signals) to the controller 30. The controller 30 according to this embodiment acquires the detection results of the first bag detection sensor 22 and the second bag detection sensor 23 in accordance with the detection result of the synchronous sensor 21 and detects the presence/absence of the abnormality of the bag 10 on the basis of the detection results.

An error processing device 40 is connected to the controller 30. When a transferred bag 10 is recognized to have an abnormality, the controller 30 sends error information specifying the bag 10 recognized to have an abnormality, to the error processing device 40. The error processing device 40 performs a process of discriminating "bags 10 recognized to have an abnormality" from "bags 10 not recognized to have an abnormality" on the basis of the error information from the controller 30. While specific contents of the discrimination process performed by the error processing device 40 are not particularly limited, the "bags 10 recognized to have an abnormality" are typically ejected from the transfer path under the control of the error processing device 40.

Figure 3A:
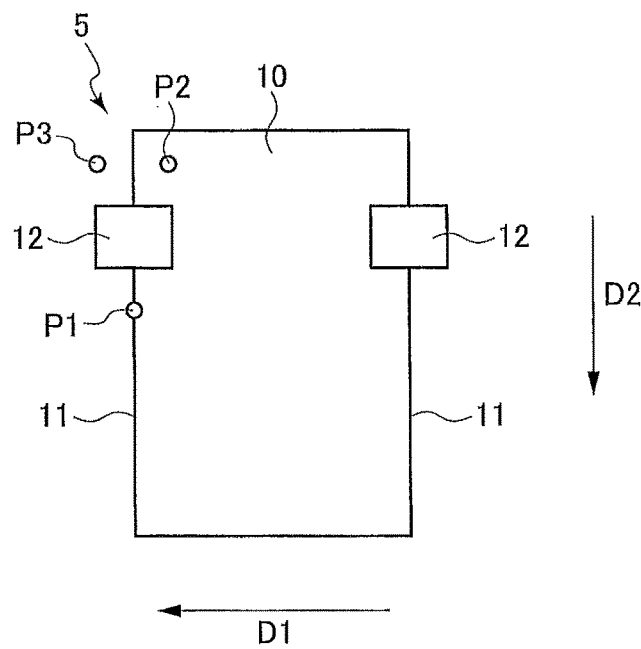
FIG. 3A is a diagram for explaining a mechanism through which the condition of the front end part of a bag is detected by the bag abnormality detection device according to the first embodiment, wherein a case where the condition of the front end part of the bag is appropriate is shown.
Figure 3B:
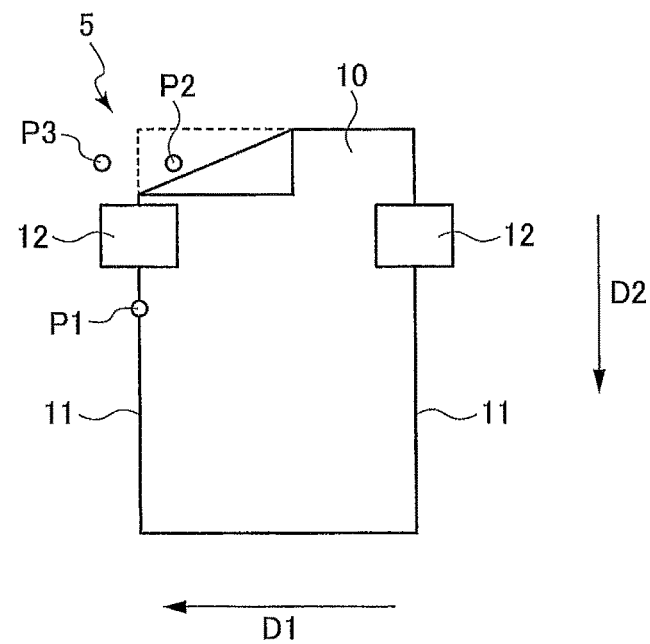
FIG. 3B is a diagram for explaining the mechanism through which the condition of the front end part of a bag is detected by the bag abnormality detection device according to the first embodiment, wherein a case where the condition of the front end part of the bag is inappropriate is shown.

FIGS. 3A and 3B are diagrams for explaining a mechanism through which the condition of the front end part of the bag 10 is detected by the bag abnormality detection device 5 according to the first embodiment. FIG. 3A shows a case where the condition of the front end part of the bag 10 is appropriate, while FIG. 3B shows a case where the condition of the front end part of the bag 10 is inappropriate. When a change from "the state in which the bag 10 is absent at the first detection point P1" to "the state in which the bag 10 is present at the first detection point P1" is detected by the synchronous sensor 21, the controller 30 acquires the detection result of the first bag detection sensor 22 regarding the presence/absence of the bag 10 at the second detection point P2. As above, the controller 30 acquires "data indicating whether the bag 10 exists at the second detection point P2 when the side edge part 11 of the bag 10 at the front end in the transfer direction passes through the first detection point P1" from the first bag detection sensor 22.

When the front end part of the bag 10 is gripped in an appropriate state and the front end part of the bag 10 (top left part of the bag 10 in the examples shown in FIGS. 3A and 3B) has no bend/fold or displacement (see FIG. 3A), a part of the bag 10 is positioned at the second detection point P2. In contrast, when the front end part of the bag 10 has a bend/fold or displacement and is not gripped in an appropriate state (see FIG. 3B), the bag 10 is not positioned at the second detection point P2. Therefore, if the detection result of the first bag detection sensor 22 when the change from "the state in which the bag 10 is absent at the first detection point P1" to "the state in which the bag 10 is present at the first detection point P1" is detected by the synchronous sensor 21 indicates that "the bag 10 exists at the second detection point P2," the controller 30 recognizes that the front end part of the bag 10 is in an appropriate condition and has no abnormality (see FIG. 3A). In contrast, if this detection result of the first bag detection sensor 22 indicates that "the bag 10 does not exist at the second detection point P2," the controller 30 recognizes that the front end part of the bag 10 has an abnormality (e.g., bend/fold, displacement, etc.) (see FIG. 3B).

Figure 4A:
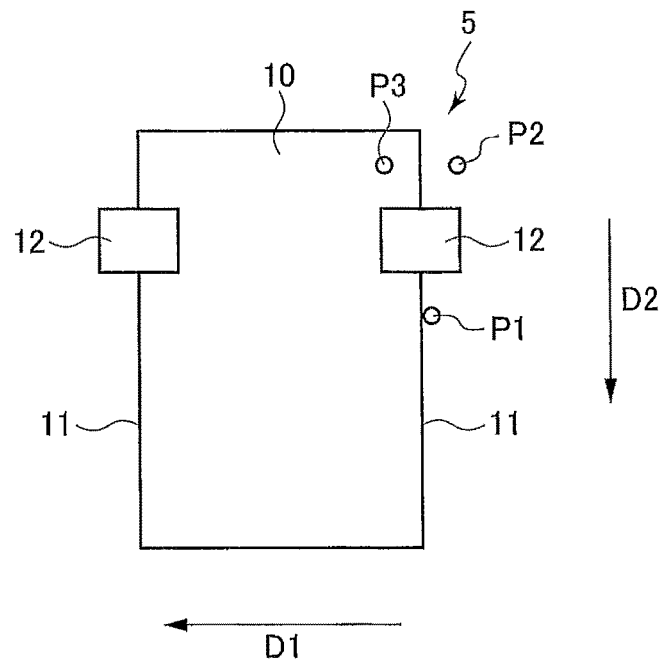
FIG. 4A is a diagram for explaining a mechanism through which the condition of the rear end part of a bag is detected by the bag abnormality detection device according to the first embodiment, wherein a case where the condition of the rear end part is appropriate is shown.
Figure 4B:
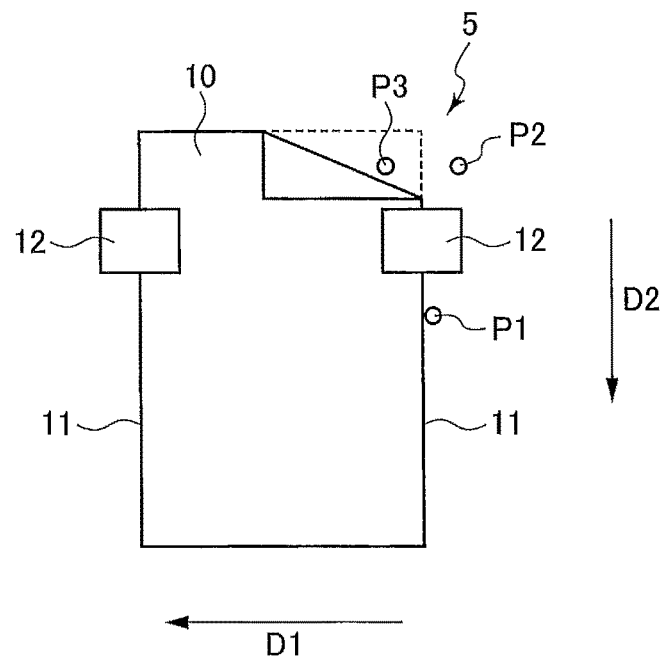
FIG. 4B is a diagram for explaining the mechanism through which the condition of the rear end part of a bag is detected by the bag abnormality detection device according to the first embodiment, wherein a case where the condition of the rear end part is inappropriate is shown.

FIGS. 4A and 4B are diagrams for explaining a mechanism through which the condition of the rear end part of the bag 10 is detected by the bag abnormality detection device 5 according to the first embodiment. FIG. 4A shows a case where the condition of the rear end part is appropriate, while FIG. 4B shows a case where the condition of the rear end part is inappropriate. When a change from "the state in which the bag 10 is present" to "the state in which the bag 10 is absent" is detected at the first detection point P1 by the synchronous sensor 21, the controller 30 acquires the detection result of the second bag detection sensor 23 regarding the presence/absence of the bag 10 at the third detection point P3. If the detection result of the second bag detection sensor 23 indicates that "the bag 10 exists at the third detection point P3," the controller 30 recognizes that the rear end part of the bag 10 (top right part of the bag 10 in the examples shown in FIGS. 4A and 4B) is in an appropriate condition and has no abnormality (see FIG. 4A). In contrast, if the detection result of the second bag detection sensor 23 indicates that "the bag 10 does not exist at the third detection point P3," the controller 30 recognizes that the rear end part of the bag 10 has an abnormality (see FIG. 4B).

Figure 5:
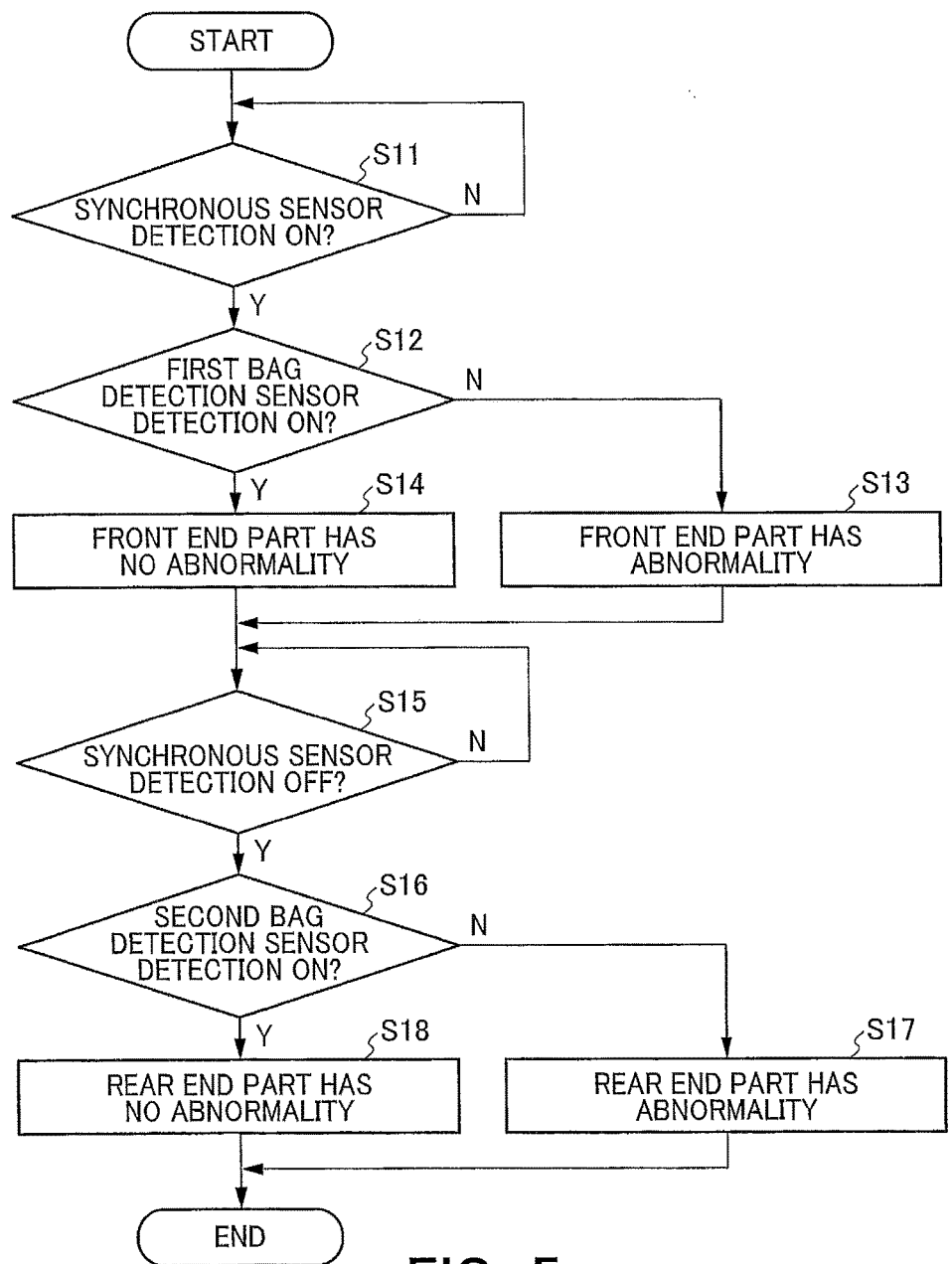
FIG. 5 is a flow chart showing an example of a bag abnormality detection method employed in a bagging packaging machine that detects an abnormality in a transferred bag.

FIG. 5 is a flow chart showing an example of a bag abnormality detection method employed in a bagging packaging machine that detects an abnormality of a transferred bag 10.

First, a step of detecting the presence/absence of the bag 10 at the first detection point P1 in the transfer path of the bag 10 is performed by the synchronous sensor 21. Specifically, a judgment is made on whether a change from the state in which the bag 10 is absent (DETECTION OFF) to the state in which the bag 10 is present (DETECTION ON) is detected by the synchronous sensor 21 at the first detection point P1 (S11 in FIG. 5). As long as the state in which the bag 10 is absent at the first detection point P1 is detected from the detection result of the synchronous sensor 21, the detection process is continuously performed by the synchronous sensor 21 (N in S11).

In contrast, when the change from the state in which the bag 10 is absent to the state in which the bag 10 is present is detected at the first detection point P1 by the synchronous sensor 21 (Y in S11), the controller 30 acquires the detection result of the first bag detection sensor 22 and judges the presence/absence of the abnormality in the front end part of the bag 10 on the basis of the detection result (S12). Specifically, a "step of detecting the presence/absence of the bag 10 at the second detection point P2 in the transfer path" is performed by the first bag detection sensor 22, and the controller 30 acquires the result of the detection from the first bag detection sensor 22. If the detection result of the first bag detection sensor 22 at that time indicates that "the bag 10 does not exist at the second detection point P2" (N in S12), the front end part of the bag 10 is recognized to have an abnormality (S13; see FIG. 3B) and the error information is sent from the controller 30 to the error processing device 40 (see FIG. 2). In contrast, if the detection result of the first bag detection sensor 22 at that time indicates that "the bag 10 exists at the second detection point P2" (Y in S12), the front end part of the bag 10 is recognized to have no abnormality (S14; see FIG. 3A) and no error information is sent from the controller 30 to the error processing device 40.

Subsequently, the presence/absence of the abnormality of the rear end part of the bag 10 is judged. Specifically, after the recognition of the presence/absence of the abnormality in the front end part of the bag 10, a judgment is made on whether a change from the state in which the bag 10 is present (DETECTION ON) to the state in which the bag 10 is absent (DETECTION OFF) is detected at the first detection point P1 by the synchronous sensor 21 (S15). As longs as the detection result of the synchronous sensor 21 indicates the state in which the bag 10 is present at the first detection point P1, the detection is continuously performed by the synchronous sensor 21 (N in S15).

In contrast, when the change from the state in which the bag 10 is present to the state in which the bag 10 is absent is detected at the first detection point P1 by the synchronous sensor 21 (Y in S15), the controller 30 acquires the detection result of the second bag detection sensor 23 and judges the presence/absence of the abnormality of the rear end part of the bag 10 on the basis of the detection result (S16).

Specifically, a "step of detecting the presence/absence of the bag 10 at the third detection point P3 in the transfer path" is performed by the second bag detection sensor 23, and the controller 30 acquires the result of the detection from the second bag detection sensor 23. If the detection result of the second bag detection sensor 23 at that time indicates that "the bag 10 does not exist at the third detection point P3" (N in S16), the rear end part of the bag 10 is recognized to have an abnormality (S17; see FIG. 4B) and the error information is sent from the controller 30 to the error processing device 40. In contrast, if the detection result of the second bag detection sensor 23 at that time indicates that "the bag 10 exists at the third detection point P3" (Y in S16), the rear end part of the bag 10 is recognized to have no abnormality (S18; see FIG. 4A) and no error information is sent from the controller 30 to the error processing device 40.

Through the above-described sequence of processes (S11-S18), the presence/absence of an abnormality of the bag 10 is detected. Bags 10 of which an abnormality has been detected are discriminated from bags 10 of which no abnormality has been detected under the control of the error processing device 40. Incidentally, the process for detecting the presence/absence of an abnormality of the rear end part of the bag 10 (S15-S18) is executed also when an abnormality is detected in the front end part of the bag 10 (S13) in the above example; however, it is also possible to skip the process for detecting the presence/absence of an abnormality in the rear end part of the bag 10 (S15-S18) when an abnormality is detected in the front end part of the bag 10 (S13).

As described above, according to the bag abnormality detection device 5 of this embodiment, the presence/absence of the abnormality regarding the transfer condition of the bag 10 can be detected with high accuracy on the basis of the detection results of the synchronous sensor 21, the first bag detection sensor 22 and the second bag detection sensor 23, without needing a complicated device configuration.

Further, by setting the detection points of the synchronous sensor 21, the first bag detection sensor 22 and the second bag detection sensor 23 (i.e., the first detection point P1, the second detection point P2 and the third detection point P3) close to each other in regard to the transfer direction D1, the detection of the presence/absence of an abnormality can be carried out for bags 10 of various sizes. Thus, even in cases where the size of each of bags 10 to be transferred (especially, the size in regard to the transfer direction D1) is changed, the presence/absence of an abnormality of each transferred bag 10 can be detected basically without the need of changing the detection points of the synchronous sensor 21, the first bag detection sensor 22 and the second bag detection sensor 23 (i.e., the first detection point P1, the second detection point P2 and the third detection point P3), and a bag abnormality detection device 5 excelling in applicability can be provided.

Furthermore, since the bag abnormality detection device 5 described above handles a bag 10 in the middle of transfer/movement as the object of detection, it is unnecessary to stop the bag 10 for the detection of the presence/absence of an abnormality. Therefore, the above-described bag abnormality detection device 5 is highly desirably applied to machines (systems) like bagging packaging machines performing various processes while continuously transferring a great number of bags 10. The above-described bag abnormality detection device 5 is applicable also to machines like bagging packaging machines performing various processes while intermittently transferring a great number of bags 10. For example, the presence/absence of an abnormality of each bag 10 can be detected with the bag abnormality detection device 5 during the transfer of the bag between intermittent stoppages. As above, the bag abnormality detection device 5 of this embodiment excels in applicability and is widely applicable to various types of machines (systems).

Incidentally, while the relative positional relationship among the first detection point P1, the second detection point P2 and the third detection point P3 is basically not limited, it is desirable to set the relative positional relationship in accordance with "the time lags from the acquisition of the detection result of the synchronous sensor 21 to the acquisition of the detection results of the first bag detection sensor 22 and the second bag detection sensor 23," "the transfer speed of the bag 10," "the respective detection ranges (especially, the detection widths in regard to the transfer direction D1) of the synchronous sensor 21, the first bag detection sensor 22 and the second bag detection sensor 23" and "the shape of the bag 10." For example, when "the time lags from the acquisition of the detection result of the synchronous sensor 21 to the acquisition of the detection results of the first bag detection sensor 22 and the second bag detection sensor 23" are long, it is desirable to set "the distance between the first detection point P1 and the third detection point P3" in regard to the transfer direction at a relatively long distance. Also when "the transfer speed of the bag 10" is high, it is desirable to set "the distance between the first detection point P1 and the third detection point P3" in regard to the transfer direction D1 at a relatively long distance. When "the detection ranges (especially, the detection widths in regard to the transfer direction D1) of the synchronous sensor 21, the first bag detection sensor 22 and the second bag detection sensor 23" are wide, "the distance between the first detection point P1 and the second detection point P2" and "the distance between the first detection point P1 and the third detection point P3" in regard to the transfer direction D1 may either be set relatively long or relatively short.

In consideration of response times of commonly used sensors and controllers, it is adequate in most cases to set "the distance between the first detection point P1 and the second detection point P2" and "the distance between the first detection point P1 and the third detection point P3" in regard to the transfer direction D1 at approximately 3 mm (millimeters) or less, and the third detection point P3 can be set in a range within 3 mm from the first detection point P1 downstream in the transfer direction D1, for example. Especially, it is adequate to set "the distance between the first detection point P1 and the second detection point P2" in regard to the transfer direction D1 in a range longer than or equal to 0 mm and shorter than or equal to 1 mm in most cases, and preferably, at 0 mm. It is sufficient in most cases to set "the distance between the first detection point P1 and the third detection point P3" in regard to the transfer direction D1 in a range longer than 0 mm and shorter than or equal to 1 mm, and preferably, in a range longer than or equal to 0.7 mm and shorter than or equal to 1 mm. However, these relative distance ranges are on the assumption that the outer shape of the bag 10 gripped by the grippers 12 is rectangular and the side edge parts of the bag 10 are arranged like straight lines parallel to the vertical direction D2. In cases where the outer shape of the bag 10 is not rectangular, it is desirable to set the relative positions among the first detection point P1, the second detection point P2 and the third detection point P3 in accordance with the specific shape of the bag 10.

Second Embodiment

In this embodiment, elements identical or similar to those in the above-described first embodiment are assigned common reference characters and detailed explanation thereof is omitted for brevity.

Figure 6A:
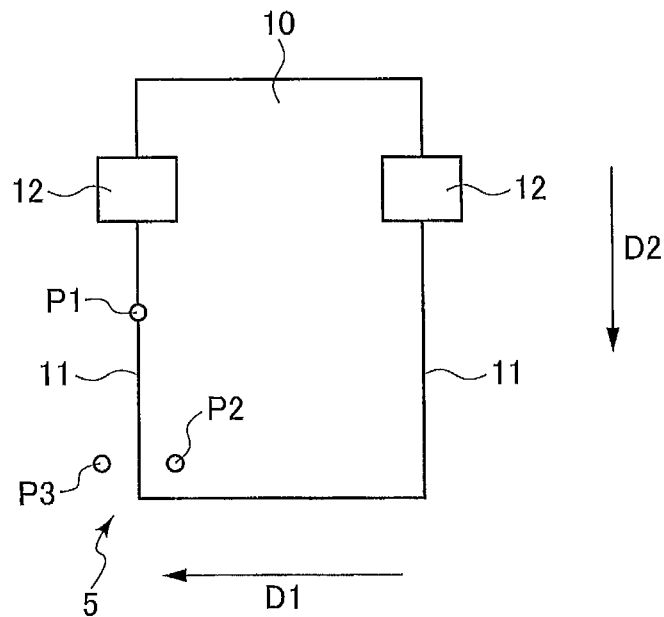
FIG. 6A is a diagram for explaining a mechanism through which the condition of the front end part of a bag is detected by a bag abnormality detection device according to a second embodiment of the present invention, wherein a case where the condition of the front end part of the bag is appropriate is shown.
Figure 6B:
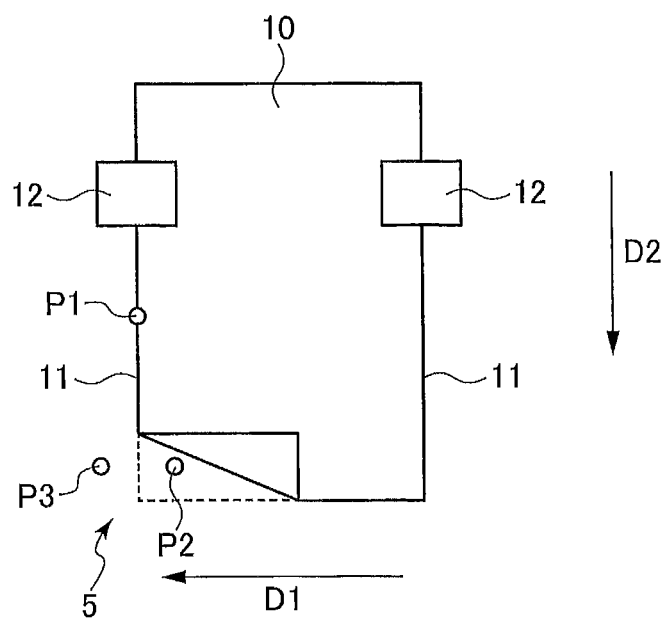
FIG. 6B is a diagram for explaining the mechanism through which the condition of the front end part of a bag is detected by the bag abnormality detection device according to the second embodiment, wherein a case where the condition of the front end part of the bag is inappropriate is shown.
Figure 7A:
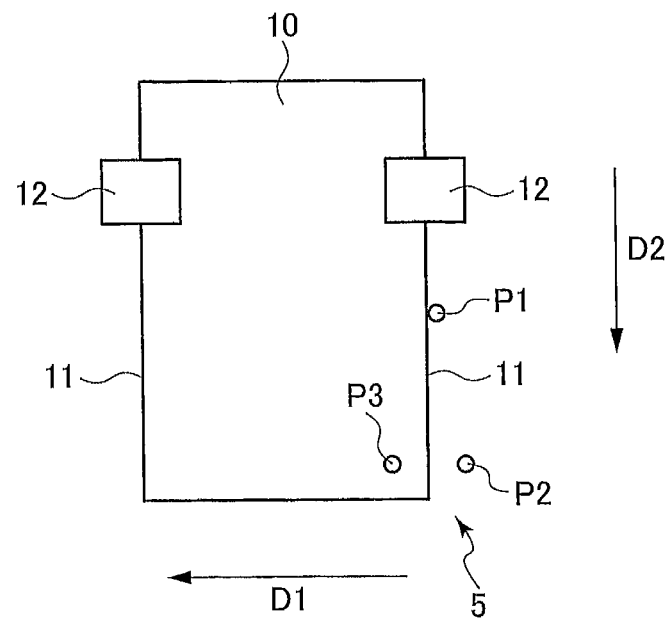
FIG. 7A is a diagram for explaining a mechanism through which the condition of the rear end part of a bag is detected by the bag abnormality detection device according to the second embodiment, wherein a case where the condition of the rear end part is appropriate is shown.
Figure 7B:
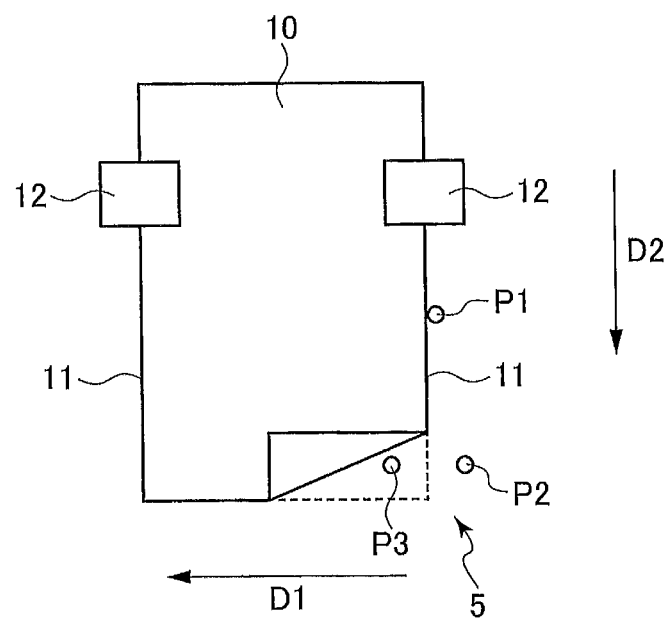
FIG. 7B is a diagram for explaining the mechanism through which the condition of the rear end part of a bag is detected by the bag abnormality detection device according to the second embodiment, wherein a case where the condition of the rear end part is inappropriate is shown.

FIGS. 6A and 6B are diagrams for explaining a mechanism through which the condition of the front end part of the bag 10 is detected by a bag abnormality detection device 5 according to a second embodiment of the present invention. FIG. 6A shows a case where the condition of the front end part of the bag 10 is appropriate, while FIG. 6B shows a case where the condition of the front end part of the bag 10 is inappropriate. FIGS. 7A and 7B are diagrams for explaining a mechanism through which the condition of the rear end part of the bag 10 is detected by the bag abnormality detection device 5 according to the second embodiment. FIG. 7A shows a case where the condition of the rear end part is appropriate, while FIG. 7B shows a case where the condition of the rear end part is inappropriate.

In this embodiment, "the detection position of the first bag detection sensor 22 (the second detection point P2)" and "the detection position of the second bag detection sensor 23 (the third detection point P3)" are set below "the detection position of the synchronous sensor 21 (the first detection point P1)" in regard to the vertical direction D2. In particular, the second detection point P2 in this embodiment is set at a position through which a lower end part (i.e., part at the bottom in the vertical direction) of the front end part of a transferred bag 10 passes, and situated below the grippers 12 gripping the bag 10 in terms of the vertical direction. The third detection point P3 in this embodiment is set at a position through which a lower end part (i.e., part at the bottom in the vertical direction) of the rear end part of the transferred bag 10 passes, and situated below the grippers 12 gripping the bag 10 in terms of the vertical direction.

The rest of the configuration is similar to that of the bag abnormality detection device 5 according to the first embodiment.

When a change from "the state in which the bag 10 is absent" to "the state in which the bag 10 is present" is detected at the first detection point P1 by the synchronous sensor 21, the controller 30 acquires the detection result of the first bag detection sensor 22 regarding the presence/absence of the bag 10 at the second detection point P2. When the front end part of the bag 10 is gripped in an appropriate state and the front end part (bottom left part of the bag 10 in the examples shown in FIGS. 6A and 6B) has no bend/fold or displacement (see FIG. 6A), a part of the bag 10 is positioned at the second detection point P2. In contrast, when the front end part of the bag 10 is not gripped in an appropriate state and the front end part (bottom left part of the bag 10 in the examples shown in FIGS. 6A and 6B) has a bend/fold or displacement (see FIG. 6B), the bag 10 is not positioned at the second detection point P2. Therefore, if the detection result of the first bag detection sensor 22 when the change from "the state in which the bag 10 is absent" to "the state in which the bag 10 is present" is detected at the first detection point P1 by the synchronous sensor 21 indicates that "the bag 10 exists at the second detection point P2," the controller 30 recognizes that the front end part of the bag 10 is in an appropriate condition and has no abnormality (see FIG. 6A). In contrast, if this detection result of the first bag detection sensor 22 indicates that "the bag 10 does not exist at the second detection point P2," the controller 30 recognizes that the front end part of the bag 10 has an abnormality (e.g., bend/fold, displacement, etc.) (see FIG. 6B).

When a change from "the state in which the bag 10 is present" to "the state in which the bag 10 is absent" is detected at the first detection point P1 by the synchronous sensor 21, the controller 30 acquires the detection result of the second bag detection sensor 23 regarding the presence/absence of the bag 10 at the third detection point P3. If the detection result of the second bag detection sensor 23 indicates that "the bag 10 exists at the third detection point P3," the controller 30 recognizes that the rear end part of the bag 10 (bottom right part of the bag 10 in the examples shown in FIGS. 7A and 7B) is in an appropriate condition and has no abnormality (see FIG. 7A). In contrast, if the detection result of the second bag detection sensor 23 indicates that "the bag 10 does not exist at the third detection point P3," the controller 30 recognizes that the rear end part of the bag 10 has an abnormality (see FIG. 7B).

As described above, also according to the bag abnormality detection device 5 of this embodiment, the presence/absence of the abnormality regarding the transfer condition of the bag 10 can be detected with high accuracy with a simple device configuration. Incidentally, the position of the first detection point P1 is not particularly limited and can be set to be immediately under the grippers 12 in the same way as in the first embodiment.

Third Embodiment

In this embodiment, elements identical or similar to those in the first embodiment are assigned common reference characters and detailed explanation thereof is omitted for brevity.

Figure 8A:
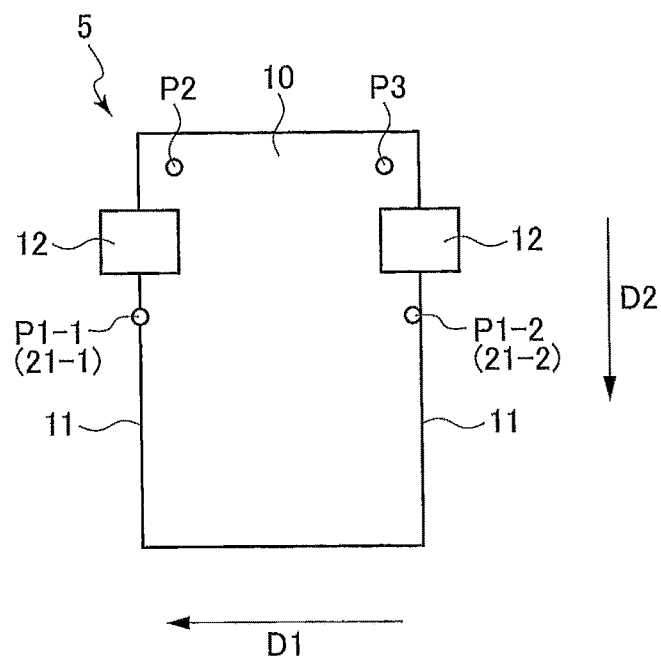
FIG. 8A is a diagram for explaining a mechanism through which the condition of the front end part of a bag is detected by a bag abnormality detection device according to a third embodiment of the present invention, wherein a case where the condition of the front end part of the bag is appropriate is shown.
Figure 8B:
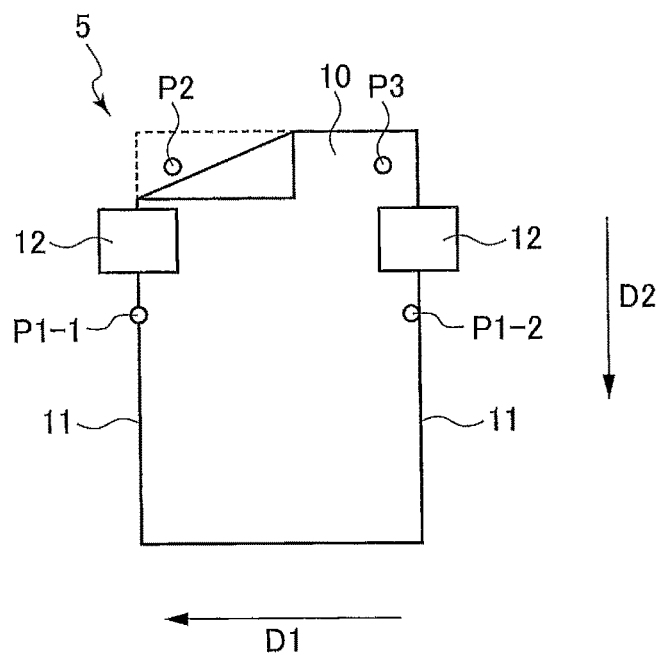
FIG. 8B is a diagram for explaining the mechanism through which the condition of the front end part of a bag is detected by the bag abnormality detection device according to the third embodiment, wherein a case where the condition of the front end part of the bag is inappropriate is shown.
Figure 9A:
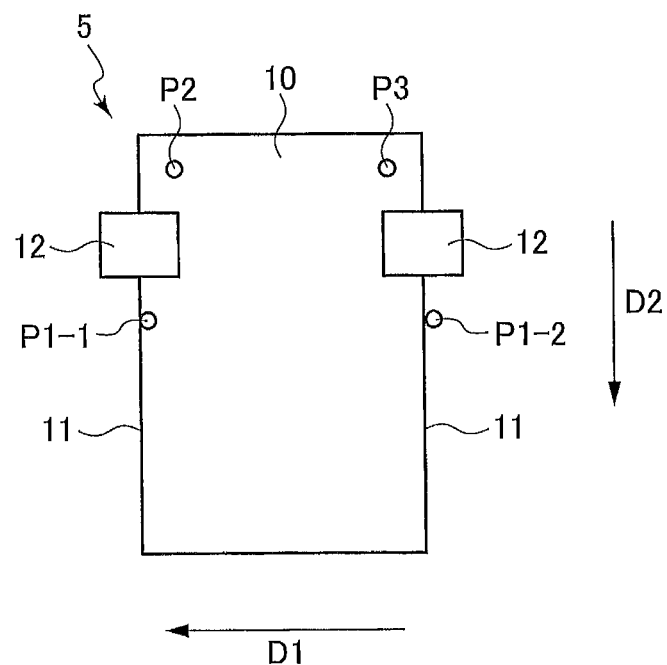
FIG. 9A is a diagram for explaining a mechanism through which the condition of the rear end part of a bag is detected by the bag abnormality detection device according to the third embodiment, wherein a case where the condition of the rear end part is appropriate is shown.
Figure 9B:
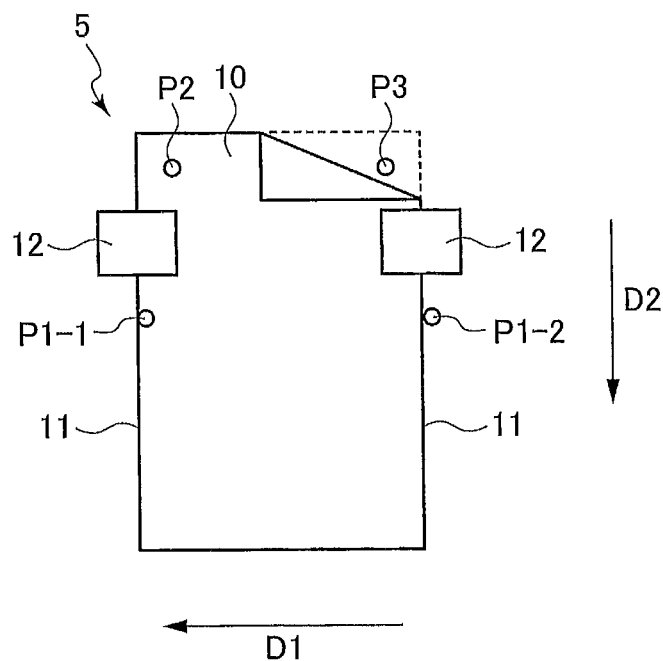
FIG. 9B is a diagram for explaining a mechanism through which the condition of the rear end part of a bag is detected by the bag abnormality detection device according to the third embodiment, wherein a case where the condition of the rear end part is inappropriate is shown.

FIGS. 8A and 8B are diagrams for explaining a mechanism through which the condition of the front end part of the bag 10 is detected by a bag abnormality detection device 5 according to a third embodiment of the present invention. FIG. 8A shows a case where the condition of the front end part of the bag 10 is appropriate, while FIG. 8B shows a case where the condition of the front end part of the bag 10 is inappropriate. FIGS. 9A and 9B are diagrams for explaining a mechanism through which the condition of the rear end part of the bag 10 is detected by the bag abnormality detection device 5 according to the third embodiment. FIG. 9A shows a case where the condition of the rear end part is appropriate, while FIG. 9B shows a case where the condition of the rear end part is inappropriate.

In this embodiment, the synchronous sensor 21 includes a first synchronous sub-sensor 21-1 and a second synchronous sub-sensor 21-2, and the first detection point P1 includes a first sub-detection point P1-1 and a second sub-detection point P1-2 in the transfer path of the bag 10. The first synchronous sub-sensor 21-1, for detecting the presence/absence of the bag 10 at the first sub-detection point P1-1, is associated with the first bag detection sensor 22 for detecting the presence/absence of the abnormality of the front end part of the bag 10. The second synchronous sub-sensor 21-2, for detecting the presence/absence of the bag 10 at the second sub-detection point P1-2, is associated with the second bag detection sensor 23 for detecting the presence/absence of the abnormality of the rear end part of the bag 10.

The second detection point P2 of the first bag detection sensor 22 is set on the upstream side of the first sub-detection point P1-1 or at the same position as the first sub-detection point P1-1 in regard to the transfer direction D1 of the bag 10. The third detection point P3 of the second bag detection sensor 23 is set on the downstream side of the second sub-detection point P1-2 or at the same position as the second sub-detection point P1-2 in regard to the transfer direction D1 of the bag 10. Incidentally, while "the first sub-detection point P1-1 and the second detection point P2" are set on the downstream side of "the second sub-detection point P1-2 and the third detection point P3" in regard to the transfer direction D1 in the examples shown in FIGS. 8A through 9B, it is also possible to set "the first sub-detection point P1-1 and the second detection point P2" on the upstream side thereof.

When a change from the state in which the bag 10 is absent to the state in which the bag 10 is present is detected at the first sub-detection point P1-1 by the first synchronous sub-sensor 21-1, the controller 30 acquires the detection result of the first bag detection sensor 22 regarding the presence/absence of the bag 10 at the second detection point P2. If this detection result indicates that the bag 10 does not exist at the second detection point P2 (see FIG. 8B), the controller 30 recognizes that the front end part of the bag 10 has an abnormality. In contrast, if this detection result indicates that the bag 10 exists at the second detection point P2 (see FIG. 8A), the controller 30 recognizes that the front end part of the bag 10 has no abnormality.

When a change from the state in which the bag 10 is present to the state in which the bag 10 is absent is detected at the second sub-detection point P1-2 by the second synchronous sub-sensor 21-2, the controller 30 acquires the detection result of the second bag detection sensor 23 regarding the presence/absence of the bag 10 at the third detection point P3. If this detection result indicates that the bag 10 does not exist at the third detection point P3 (see FIG. 9B), the controller 30 recognizes that the rear end part of the bag 10 has an abnormality. In contrast, if this detection result indicates that the bag 10 exists at the third detection point P3 (see FIG. 9A), the controller 30 recognizes that the rear end part of the bag 10 has no abnormality.

The rest of the configuration is similar to that of the bag abnormality detection device 5 according to the first embodiment.

When a change from "the state in which the bag 10 is absent" to "the state in which the bag 10 is present" is detected at the first sub-detection point P1-1 by the first synchronous sub-sensor 21-1, the controller 30 acquires the detection result of the first bag detection sensor 22 regarding the presence/absence of the bag 10 at the second detection point P2. When the front end part of the bag 10 (top left part of the bag 10 in the examples shown in FIGS. 8A and 8B) is gripped in an appropriate state and has no bend/fold or displacement (see FIG. 8A), a part of the bag 10 is positioned at the second detection point P2. In contrast, when the front end part of the bag 10 (top left part of the bag 10 in the examples shown in FIGS. 8A and 8B) has a bend/fold or displacement and is not gripped in an appropriate state (see FIG. 8B), the bag 10 is not positioned at the second detection point P2. Therefore, if the detection result of the first bag detection sensor 22 when the change from "the state in which the bag 10 is absent" to "the state in which the bag 10 is present" is detected at the first sub-detection point P1-1 by the first synchronous sub-sensor 21-1 indicates that "the bag 10 exists at the second detection point P2," the controller 30 recognizes that the front end part of the bag 10 is in an appropriate condition and has no abnormality (see FIG. 8A). In contrast, if this detection result of the first bag detection sensor 22 indicates that "the bag 10 does not exist at the second detection point P2," the controller 30 recognizes that the front end part of the bag 10 has an abnormality (e.g., bend/fold, displacement, etc.) (see FIG. 8B).

When a change from "the state in which the bag 10 is present" to "the state in which the bag 10 is absent" is detected at the second sub-detection point P1-2 by the second synchronous sub-sensor 21-2, the controller 30 acquires the detection result of the second bag detection sensor 23 regarding the presence/absence of the bag 10 at the third detection point P3. If this detection result of the second bag detection sensor 23 indicates that "the bag 10 exists at the third detection point P3," the controller 30 recognizes that the rear end part of the bag 10 (top right part of the bag 10 in the examples shown in FIGS. 9A and 9B) is in an appropriate condition and has no abnormality (see FIG. 9A). In contrast, if this detection result of the second bag detection sensor 23 indicates that "the bag 10 does not exist at the third detection point P3," the controller 30 recognizes that the rear end part of the bag 10 has an abnormality (see FIG. 9B).

As described above, also according to the bag abnormality detection device 5 of this embodiment, the presence/absence of the abnormality regarding the transfer condition of the bag 10 can be detected with high accuracy with a simple device configuration. In particular, in this embodiment, the presence/absence of an abnormality in the front end part of the bag 10 is detected with "the first synchronous sub-sensor 21-1 and the first bag detection sensor 22" and the presence/absence of an abnormality in the rear end part of the bag 10 is detected with "the second synchronous sub-sensor 21-2 and the second bag detection sensor 23." Therefore, the timing for detecting the side edge part of the bag 10 at the front end in the transfer direction and the timing for detecting the side edge part of the bag 10 at the rear end in the transfer direction can be adjusted flexibly, and it becomes possible to detect the presence/absence of an abnormality in regard to the front end part and the rear end part of the bag 10 at the same time, for example. Further, it is also possible to change the vertical direction positions of the first sub-detection point P1-1 and the second sub-detection point P1-2.

Bagging Packaging Machine

Next, an example of arrangement of the bag abnormality detection device in a bagging packaging machine will be described below.

Figure 10:
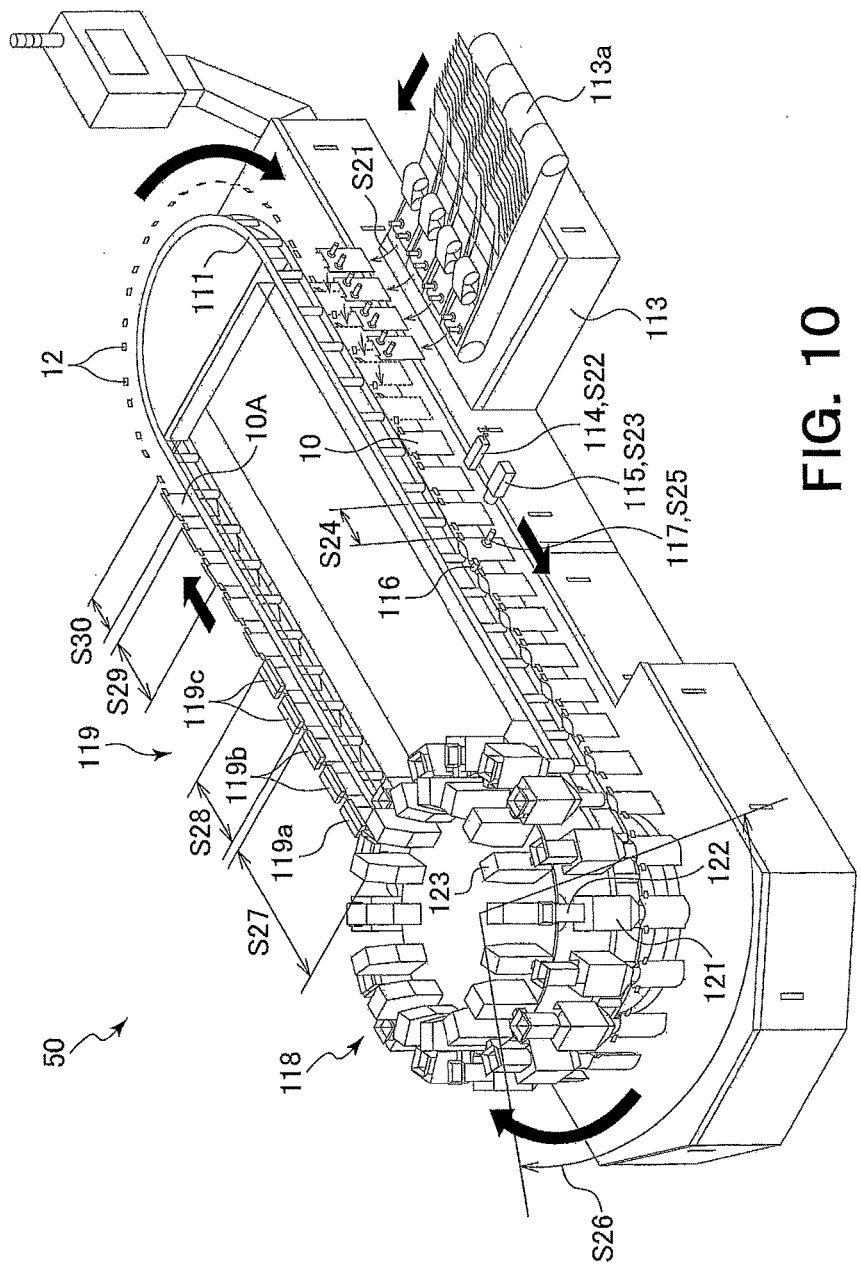
FIG. 10 is a perspective view showing an example of a bagging packaging machine of a continuous transfer type.

FIG. 10 is a perspective view showing an example of a bagging packaging machine 50 of a continuous transfer type. The bagging packaging machine 50 in this example includes: an endless chain 111 that moves along an annular path in a shape like a race track having an arc-like part on either end and a straight part on either side; and multiple sets of grippers 12 (a pair makes a set) that are arranged along the length of the endless chain 111 at even intervals and move together with the endless chain 111 along the annular path in the race track shape. Arranged along the annular path of the grippers 12 are a bag supply device 113, a printing device 114, a printing inspection device 115, a bag mouth opening device (only suction cups 116 and 117 are shown), a loading device 118, a sealing device 119, an empty bag releasing device (not illustrated), a product bag ejecting device (not illustrated), etc. In the process in which the grippers 12 turn and move along the annular path, various operations are performed, such as the supply of each bag 10 to the grippers 12 by means of the bag supply device 113, the gripping of the side edge parts of each bag 10 by means of the grippers 12, the printing of a production date/time on the surface of each bag 10 by the printing device 114, the printing inspection by the printing inspection device 115, the opening of the bag mouth by the bag mouth opening device (suction cups 116 and 117), the loading of the contents into each bag 10 by the loading device 118, the sealing of the bag mouth (including the cooling) by the sealing device 119, and the ejection of a product bag 10A by the product bag ejecting device.

The endless chain 111, the grippers 12 and a mechanism for moving the endless chain 111 are equivalent to those described in Japanese patent application publication No. 2002-302227 and Japanese patent application publication No. 2009-161230. The endless chain 111 is a chain made by connecting a plurality of links into an endless shape via connecting shafts. A set (pair) of grippers 12 is provided on the outer face of each link. The grippers 12 are arranged at even intervals along the endless chain 111. According to the movement of the endless chain 111, the grippers 12 continuously rotates at a constant speed in a horizontal plane and along the annular path in the race track shape (clockwise in a plan view in FIG. 10). The bags 10 gripped by the grippers 12 are continuously transferred at the constant speed and at even intervals along the annular path in the race track shape and in a horizontal plane. The bag supply device 113 is equivalent to the empty bag supply devices described in Japanese patent application publication No. 2002-308223 and Japanese patent application publication No. 2009-161230. Specifically, the bag supply device 113 is combined with a conveyer magazine-type bag feeding device 113a and supplies four bags 10 to four sets of grippers 12 at the same time, one bag to each set of grippers. The printing device 114 and the printing inspection device 115 are devices of commonly known types.

The loading device 118 includes many elevating hoppers 121 arranged at even angular intervals, turning at a constant speed along a circular orbit, and ascending and descending with prescribed timing. Measurement hoppers 122 and measurement boxes 123 are arranged at even angular intervals corresponding to the elevating hoppers 121 and turn at the constant speed along the circular orbit along with the elevating hoppers 121. The bottom of each measurement hopper 122 is equipped with a shutter (not illustrated) for opening and closing the bottom opening of the measurement hopper 122. A weight detector (of the load cell type, for example), which is not illustrated, for measuring the weight of the contents supplied to each measurement hopper 122 is set in each measurement box 123. Half of the circular orbit of the elevating hoppers 121 vertically overlaps (a semicircular part of) the transfer path of the bags 10 gripped by the grippers 12. The revolution speed of the elevating hoppers 121 coincides with the transfer speed of the grippers 12. The elevating hoppers 121 rotate and move immediately over (the semicircular part of) the transfer path of the bags 10 gripped by the grippers 12 in sync with the transfer of the bags 10.

In the loading device 118, when the contents are supplied from a supply means (not illustrated) to the inside of a measurement hopper 122 with prescribed timing, the weight of the contents is measured by the weight detector in the measurement box 123. Subsequently, an elevating hopper 121 lowers, its bottom part is inserted into a bag 10, the shutter of the measurement hopper 122 opens, and the contents drop through the elevating hopper 121 and are loaded into the bag 10. The operation after the insertion of the elevating hopper 121's bottom part into the bag 10 to the loading of the contents into the bag 10 is performed while the elevating hopper 121 rotates and moves in sync with the transfer of the bag 10.

The sealing device 119 is formed of a first sealing device 119a (only seal bars on the downstream side is illustrated) which causes seal bars to sandwich the mouth of a bag 10 after the loading of the contents so as to heat seal the bag mouth, a second sealing device 119b (only both of its seal bars are illustrated), and a seal part cooling device 119c (only both of its cooling bars are illustrated) which causes cooling bars to sandwich the seal part so as to cool the seal part. In the same way as in the sealing device described in Japanese patent application publication No. 2001-72004, each of these devices 119a, 119b and 119c performs an operation of moving to follow the grippers 12 at the same speed as the grippers for a prescribed distance, having the seal bars or cooling bars sandwich the bag mouth of the bag 10 and then separate from the bag mouth during the following movement, and thereafter returning to the original position. In this example, two bags are heat sealed at the same time by the first sealing device 119a, subsequently heat sealed at the same time (for the second time) by the second sealing device 119b, and then cooled at the same time by the seal part cooling device 119c.

The product bag ejecting device opens gripping parts of the grippers 12 reaching a prescribed position to drop a product bag 10A onto a shoot (not illustrated) and then unloads the product bag 10A by using an unloading conveyer (not illustrated) in the same way as the opening/closing devices (including an opening/closing member, its driving mechanism, etc.) described in Japanese patent application publication Nos. 2002-302227 and 2009-161230. Incidentally, such an opening/closing device is arranged also at the position of the bag supply device 113 and opens the gripping parts of the grippers 12 when the bags 10 are supplied to the grippers 12 (operates simultaneously for four sets of grippers 12). The empty bag releasing device (not illustrated) is arranged slightly upstream of the product bag ejecting device in the same way as the inferior bag ejecting device described in Japanese patent application publication No. 2009-161230. The empty bag releasing device, which is functionally equivalent to the product bag ejecting device, opens the gripping parts of the grippers 12 and thereby drops an empty bag 10.

Further, in the bagging packaging machine 50 of this example, another empty bag releasing device (not illustrated) is arranged also between the printing inspection device 115 and the bag mouth opening device (suction cups 116 and 117).

Figure 11:
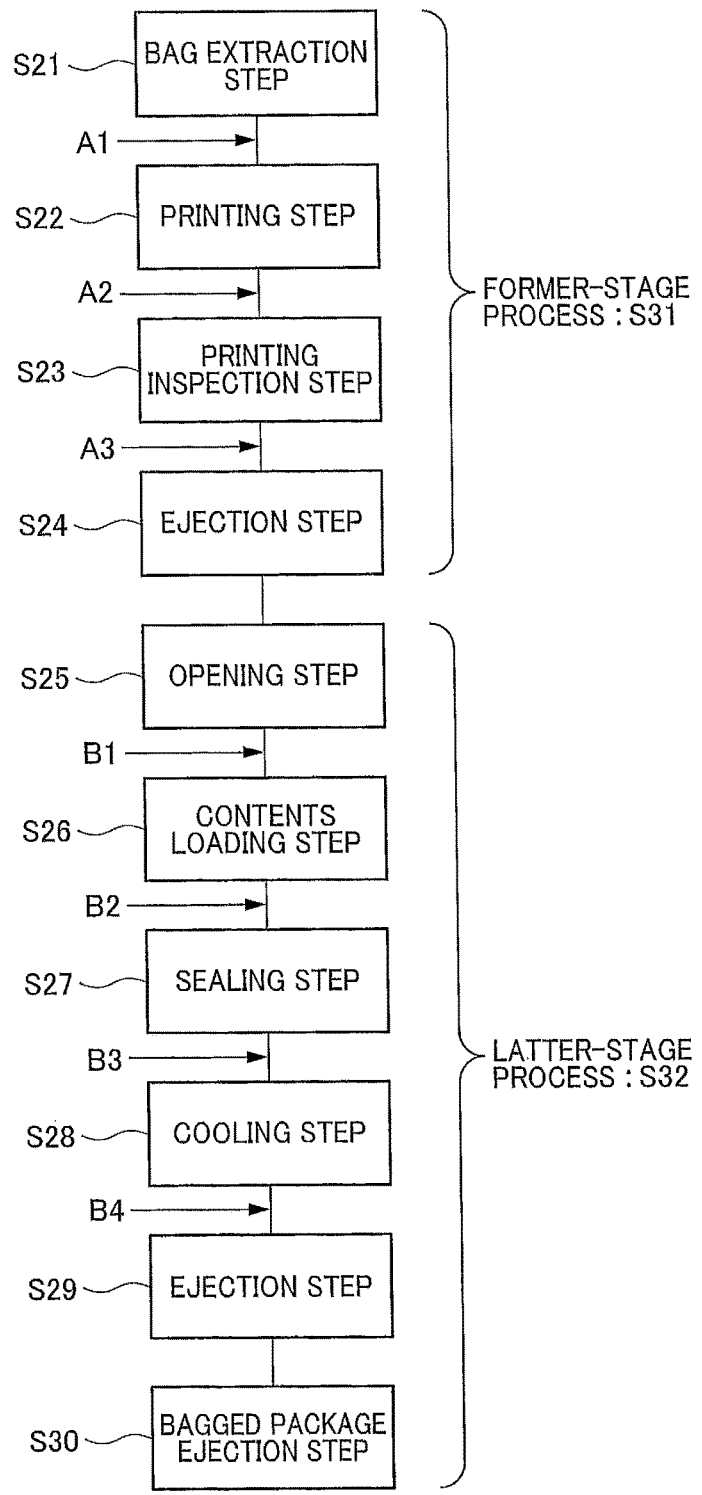
FIG. 11 is a block diagram showing various steps performed by the bagging packaging machine shown in FIG. 10.

FIG. 11 is a block diagram showing various steps performed in the bagging packaging machine 50 shown in FIG. 10. First, a bag extraction step S21 is performed, in which each empty bag 10 with its bag mouth closed is supplied from the conveyer magazine-type bag feeding device 113a to the grippers 12. The method of the supply from the conveyer magazine-type bag feeding device 113a to the grippers 12 is not particularly limited. For example, the bags 10 can be supplied to the continuously moving grippers 12 by raising each bag 10 up with suction cups while extracting the bag 10 from the conveyer magazine-type bag feeding device 113a, gripping the top end part of the bag 10 with a chuck member, moving the chuck member in the state of gripping the top end part of the bag 10, having the grippers 12 grip the side edge parts of the bag 10 whose top end part has been gripped by the chuck member, and releasing the grip by the chuck member in the state in which the bag 10 is gripped by the grippers 12.

Subsequently, a printing step S22 is performed, in which various types of information (e.g., best-before date) is printed by the printing device 114 on one surface of a bag 10 gripped by the grippers 12 (the surface facing the outside of the bagging packaging machine 50 in the example shown in FIG. 10). Subsequently, a printing inspection step S23 is performed, in which whether the condition of the printing on each bag 10 is appropriate is judged by the printing inspection device 115.

Subsequently, an ejection step S24 is performed, in which bags 10 judged to have defective printing (including cases where no printing has been performed) as the result of the printing inspection step S23 are released from the grip by the grippers 12 and ejected from the transfer path.

Subsequently, an opening step S25 is performed, in which the bag mouth of each bag 10 is opened. Subsequently, a contents loading step S26 is performed, in which the contents are loaded into each bag 10 by the cooperative operation of the loading device 118 (the elevating hoppers 121, the measurement hoppers 122 and the measurement boxes 123). Subsequently, a sealing step S27 is performed, in which the bag mouth of each bag 10 is sealed. Then, a cooling step S28 is performed, in which the seal part of each bag 10 is cooled down and the sealing condition is stabilized.

Subsequently, an ejection step S29 is performed, in which defective bags 10 are released from the grip by the grippers 12 and ejected from the transfer path. Then, a bagged package ejection step S30 is performed, in which each product bag 10A loaded with the contents and sealed appropriately is ejected toward a subsequent stage.

In the bagging packaging machine 50 in which the above-described sequence of processes are performed continuously, the bag abnormality detection process performed by the bag abnormality detection device 5 may either be performed in a former-stage process S31 prior to the opening step S25 for opening the bags 10 or in a latter-stage process S32 subsequent to the opening step S25. While the bag abnormality detection process may be performed in any interval between steps in the former-stage process S31, it is especially desirable to perform the bag abnormality detection process immediately after the bag extraction step S21 (see the reference character "A1" in FIG. 11). In the bag extraction step S21 in which each bag 10 is handed over, abnormality tends to occur in the gripping condition of the bag 10. Further, reuse of bags 10 detected to have an abnormality is made possible by performing the bag abnormality detection process before the printing step S22, practically skipping subsequent steps such as the printing step S22 for the bags 10 detected to have an abnormality, and ejecting the bags 10 in the ejection step S29.

While the bag abnormality detection process may be performed in any interval between steps in the latter-stage process S32, it is especially desirable to perform the bag abnormality detection process before the sealing step S27 (see the reference characters "B1" and "B2" in FIG. 11). In this case, by practically skipping the sealing step S27 for bags 10 detected to have an abnormality, useless defective sealing can be avoided. Further, by performing the bag abnormality detection process before the contents loading step S26 (see the reference character "B1" in FIG. 11), practically skipping subsequent steps such as the contents loading step S26 for bags 10 detected to have an abnormality, and ejecting the bags 10 in the ejection step S29, reuse of the bags 10 detected to have an abnormality is made possible.

Incidentally, the timing (position) of the ejection step (see "S24" and "S29" in FIG. 11) is not limited as long as it is after the bag abnormality detection process is conducted. For example, by performing the ejection step immediately after the bag abnormality detection process, the need of skipping subsequent steps in accordance with the result of the bag abnormality detection is eliminated and the configuration of the bagging packaging machine 50 can be simplified. By performing the ejection step after another inspection step such as the printing inspection step S23, "a bag ejection process in accordance with the result of the inspection" and "a bag ejection process in accordance with the result of the bag abnormality detection" can be performed at the same time in one step, which makes it possible to reduce the total number of steps in the bagging packaging machine 50 and simplify the configuration of the bagging packaging machine 50.

Other Modifications

The present invention is not limited to the above-described embodiments and modifications; it is also possible to add other desired elements to the above-described embodiments and modifications or to properly combine part or all of one of the above-described embodiments and modifications with part or all of another one of the above-described embodiments and modifications. For example, the second detection point P2 and the third detection point P3 in the bag abnormality detection device 5 of the third embodiment shown in FIGS. 8A through 9B may also be arranged below the grippers 12 in terms of the vertical direction, as in the second embodiment. It is also possible to arrange four bag detection sensors similar to the first and second bag detection sensors 22 and 23 at positions respectively through which the four corners (the top left part, the top right part, the bottom left part and the bottom right part) of the bag 10 pass and thereby detect the presence/absence of an abnormality at the four corners of the bag 10.

Further, the method for the controller 30 to acquire the detection results of the first bag detection sensor 22 and the second bag detection sensor 23 in accordance with the detection result of the synchronous sensor 21 is also not particularly limited. For example, the controller 30 may operate the first bag detection sensor 22 to detect the presence/absence of the bag 10 at the second detection point P2 after the passage of the bag 10's side edge part 11 at the front end in the transfer direction through the first detection point P1 is detected by the synchronous sensor 21. Alternatively, the controller 30 may continuously perform the detection with the first bag detection sensor 22 while the bag 10 is transferred and have the first bag detection sensor 22 detect the presence/absence of the bag 10 at the second detection point P2 by acquiring the detection result of the first bag detection sensor 22 at the same time or substantially the same time as the detection of the passage of the bag 10's side edge part 11 at the front end in the transfer direction through the first detection point P1 by the synchronous sensor 21. The same applies to the second bag detection sensor 23, the first synchronous sub-sensor 21-1 and the second synchronous sub-sensor 21-2 (see FIGS. 8A-9B).

While the detection point of the first bag detection sensor 22 (second detection point P2) and the detection point of the second bag detection sensor 23 (third detection point P3) in the illustrated examples are set at positions substantially the same as each other in regard to the vertical direction, the second detection point P2 and the third detection point P3 may also be set at positions different from each other in regard to the vertical direction.

While the presence/absence of an abnormality of "a bag 10 in the vertically suspended state" is detected by the bag abnormality detection device 5 (bag abnormality detection method) in the above-described embodiments and modifications, the presence/absence of an abnormality of "a bag 10 extending in a direction other than the vertical direction (e.g., in a horizontal direction orthogonal to the vertical direction)" may also be detected by the bag abnormality detection device 5 (bag abnormality detection method). In this case, the second detection point P2 and the third detection point P3 may also be arranged at positions different from the first detection point P1 in regard to an extending direction of the bag 10 orthogonal to the transfer direction of the bag 10. Here, the "extending direction of the bag 10 orthogonal to the transfer direction of the bag 10" can be set as the lengthwise direction of the bag 10, for example, and the second detection point P2 and the third detection point P3 may be set at positions corresponding to the end parts of the bag 10 in regard to the lengthwise direction. Further, the "bag 10 extending in a direction other than the vertical direction" may be transferred in a state of being gripped by grippers. In the case where the detection of the presence/absence of an abnormality is made for such a bag 10 transferred in the state of being gripped by grippers, "the first detection point P1" and "the second detection point P2 and the third detection point P3" may either be arranged on sides opposite to each other via the grippers or on the same side of the grippers with reference to the extending direction (lengthwise direction) of the bag 10.

While the above embodiments and modifications have been described by using the bagging packaging machine 50 which performs a process including the step of loading the contents into the bag 10, as the object of application of the bag abnormality detection device 5 (bag abnormality detection method), the bag abnormality detection device 5 is applicable also to machines (systems) other than such bagging packaging machines 50. For example, the bag abnormality detection device 5 according to the present invention is applicable also to a machine for attaching various members to a bag 10 without performing the process of loading contents into the bag 10. A spout attachment machine for attaching a spout (discharge outlet) to a bag 10 can be raised as an example of such a machine. In this case, the presence/absence of an abnormality in the transfer condition of the bag 10 can be detected with high accuracy by using the bag abnormality detection device 5 and the bag abnormality detection method according to the present invention, before the various members (e.g., spout) are attached to the bag 10, for example.

Modes of the present invention are not limited to the individual embodiments described above but contain a variety of modifications conceivable by those skilled in the art, and effects of the present invention are also not limited to those described above. Namely, various additions, changes and partial deletions are possible within the range not departing from the conceptual idea and content of the present invention derived from the contents specified in the claims and equivalents thereof.

The invention claimed is:

1. A bag abnormality detection device for detecting an abnormality of a bag that is transferred, the bag abnormality detection device comprising:
    a synchronous sensor that detects presence or absence of the bag at a first detection point in a transfer path of the bag;
    a first bag detection sensor that detects presence or absence of the bag at a second detection point in the transfer path, the second detection point being at a same position as the first detection point or on an upstream side of the first detection point in regard to a transfer direction of the bag;
    a second bag detection sensor that detects presence or absence of the bag at a third detection point in the transfer path, the third detection point being at a same position as the first detection point or on a downstream side of the first detection point in regard to the transfer direction of the bag; and
    a controller that controls the synchronous sensor, the first bag detection sensor and the second bag detection sensor, wherein
    when the synchronous sensor detects a change from a state in which the bag is absent at the first detection point to a state in which the bag is present at the first detection point, the controller acquires a detection result of the first bag detection sensor regarding the presence or absence of the bag at the second detection point, and when the detection result of the first bag detection sensor indicates that the bag does not exist at the second detection point, the controller recognizes that the bag has an abnormality, and
    when the synchronous sensor detects a change from a state in which the bag is present at the first detection point to a state in which the bag is absent at the first detection point, the controller acquires a detection result of the second bag detection sensor regarding the presence or absence of the bag at the third detection point, and when the detection result of the second bag detection sensor indicates that the bag does not exist at the third detection point, the controller recognizes that the bag has an abnormality.

2. The bag abnormality detection device according to claim 1, wherein the second detection point and the third detection point are arranged at positions different from the first detection point in regard to a direction which is perpendicular to the transfer direction of the bag and in which the bag extends.

3. The bag abnormality detection device according to claim 2, wherein
    the bag is transferred in a state where the bag extends in a vertical direction, and
    the second detection point and the third detection point are arranged above the first detection point in regard to the vertical direction.

4. The bag abnormality detection device according to claim 2, wherein
    the bag is transferred in a state where the bag extends in a vertical direction, and
    the second detection point and the third detection point are arranged below the first detection point in regard to the vertical direction.

5. The bag abnormality detection device according to claim 1, wherein
    the synchronous sensor includes a first synchronous sub-sensor and a second synchronous sub-sensor,
    the first detection point includes a first sub-detection point and a second sub-detection point in the transfer path of the bag,
    the first synchronous sub-sensor detects presence or absence of the bag at the first sub-detection point,
    the second synchronous sub-sensor detects presence or absence of the bag at the second sub-detection point,
    the second detection point is situated at a same position as the first sub-detection point or on an upstream side of the first sub-detection point in regard to the transfer direction of the bag, the third detection point is situated at a same position as the second sub-detection point or on a downstream side of the second sub-detection point in regard to the transfer direction of the bag, when the first synchronous sub-sensor detects a change from a state in which the bag is absent at the first sub-detection point to a state in which the bag is present at the first sub-detection point, the controller acquires the detection result of the first bag detection sensor regarding the presence or absence of the bag at the second detection point, and when the detection result of the first bag detection sensor indicates that the bag does not exist at the second detection point, the controller recognizes that the bag has an abnormality, and when the second synchronous sub-sensor detects a change from a state in which the bag is present at the second sub-detection point to a state in which the bag is absent at the second sub-detection point, the controller acquires the detection result of the second bag detection sensor regarding the presence or absence of the bag at the third detection point, and when the detection result of the second bag detection sensor indicates that the bag does not exist at the third detection point, the controller recognizes that the bag has an abnormality.

6. The bag abnormality detection device according to claim 1, wherein the third detection point is situated in a range within 3 mm from the first detection point.

7. The bag abnormality detection device according to claim 1, wherein the bag is transferred in a state where the bag is gripped by a gripper, the first detection point is situated below, in a vertical direction, the gripper that grips the bag transferred in the transfer path, and the second detection point and the third detection point are situated above, in the vertical direction, the gripper that grips the bag transferred in the transfer path.

8. A bag abnormality detection method of detecting an abnormality of a bag that is transferred, the bag abnormality detection method comprising the steps of:

causing a synchronous sensor to detect presence or absence of the bag at a first detection point in a transfer path of the bag;

causing a first bag detection sensor to detect presence or absence of the bag at a second detection point in the transfer path, the second detection point being at a same position as the first detection point or on an upstream side of the first detection point in regard to a transfer direction of the bag; and causing a second bag detection sensor to detect presence or absence of the bag at a third detection point in the transfer path, the third detection point being at a same position as the first detection point or on a downstream side of the first detection point in regard to the transfer direction of the bag, wherein when the synchronous sensor detects a change from a state in which the bag is absent at the first detection point to a state in which the bag is present at the first detection point, a detection result of the first bag detection sensor regarding the presence or absence of the bag at the second detection point is acquired, and when the detection result of the first bag detection sensor indicates that the bag does not exist at the second detection point, the bag is recognized to have an abnormality, and when the synchronous sensor detects a change from a state in which the bag is present at the first detection point to a state in which the bag is absent at the first detection point, a detection result of the second bag detection sensor regarding the presence or absence of the bag at the third detection point is acquired, and when the detection result of the second bag detection sensor indicates that the bag does not exist at the third detection point, the bag is recognized to have an abnormality.

\* \* \* \* \*